April 17, 1951 R. B. MARSHALL 2,549,617
SLIDING SHELF CONSTRUCTION FOR FOOD MIXERS
Filed Sept. 10, 1949 2 Sheets-Sheet 2

INVENTOR.
Robert B. Marshall.
BY W. B. Harpman
ATTORNEY.

Patented Apr. 17, 1951

2,549,617

UNITED STATES PATENT OFFICE 2,549,617

SLIDING SHELF CONSTRUCTION FOR FOOD MIXERS

Robert B. Marshall, Youngstown, Ohio

Application September 10, 1949, Serial No. 114,963

4 Claims. (Cl. 312—29)

This invention relates to cabinets and more particularly to a cabinet incorporating a sliding shelf construction particularly adapted for supporting a food mixer.

The principal object of the invention is the provision of a sliding shelf construction which will support a food mixer in vertical position when the shelf construction is extended and which will hold the food mixer on its side when the shelf construction is retracted.

A further object of the invention is the provision of a means of mounting and storing a food mixer in a space, the height of which is less than the vertical height of the food mixer.

A still further object of the invention is the provision of a sliding shelf construction for supporting a food mixer and which construction may be camouflaged to appear as a drawer in a cabinet construction.

The sliding shelf construction for a food mixer as disclosed herein comprises a novel means of providing for the storage and positioning in use of a food mixer and which construction may be built into a cabinet such as a kitchen cabinet or cupboard such as are usually associated with various built-in cabinetwork in kitchens and the like.

One of the other objects of the invention is, therefore, the provision of a cabinet construction incorporating means for storing a food mixer out of sight and enabling it to be moved into usable position easily and quickly.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1:
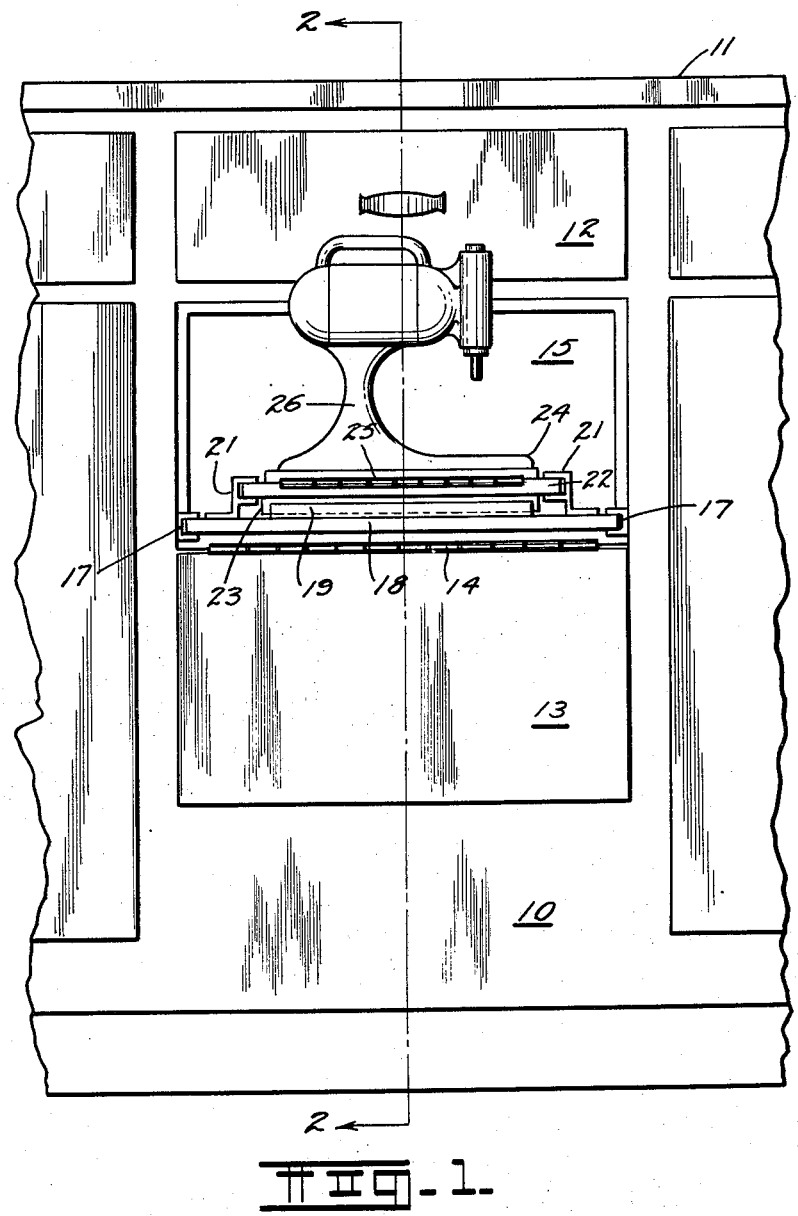
Figure 1 is a front view of a cabinet showing the food mixer supporting shelf in extended position.
Figure 2:
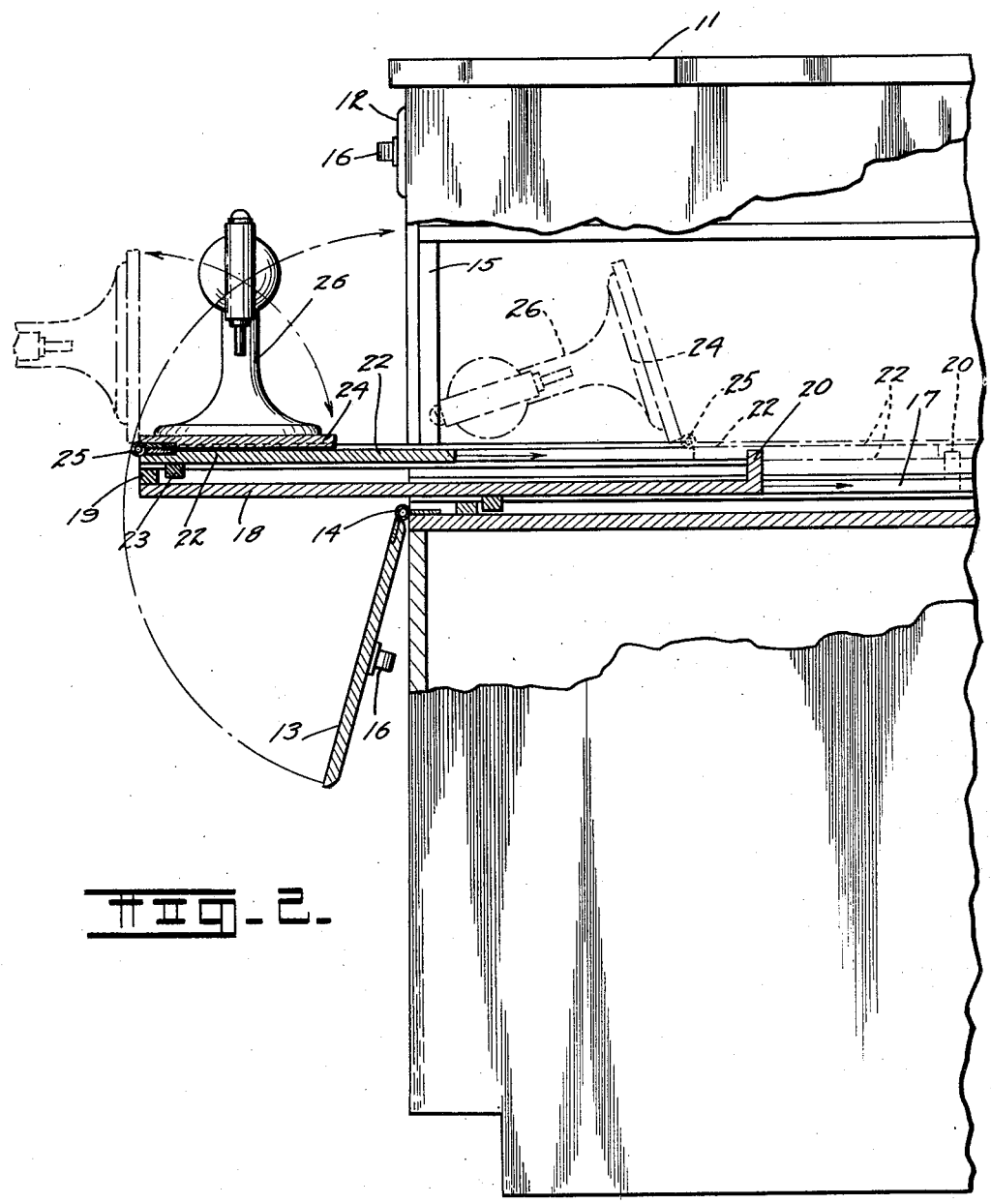
Figure 2 is a side view of a cabinet showing the food mixer supporting shelf in extended position. Dotted lines in Figure 2 show the food mixer in retracted position.

By referring to the drawings and Figures 1 and 2 in particular it will be seen that a cabinet such as a kitchen cabinet has been disclosed and is generally indicated by the numeral 10. The cabinet has the conventional work surface 11 and at least one drawer 12 therein. A false drawer front 13 is hinged horizontally at its lowermost edge by a hinge 14 to a rectangular opening 15 formed in the front of the cabinet 10 and preferably in vertical alignment with one of the drawers 12 therein. The false drawer front 13 forms in effect a door for closing the opening 15 and is therefore provided with a drawer pull 16 to correspond with the drawer pulls on the other drawers 12. The opening 15 in the cabinet has a pair of oppositely disposed U-shaped guides 17—17 mounted on the sides of the cabinet defining the opening 15 and near the bottom of the opening 15 and extending horizontally rearwardly in the cabinet. A sliding shelf 18 is mounted in the oppositely disposed guides 17—17 so that its edges will engage the same and so that it will slide inwardly and outwardly of the cabinet and be held and guided by the guides 17—17.

The foremost end of the sliding shelf 18 is provided with a raised front edge 19 and the rearmost end of the sliding shelf 18 is provided with a raised rear edge 20. A pair of oppositely disposed secondary guide members 21—21 are positioned on the sliding shelf 18 adjacent the side edges thereof and inwardly with respect thereto so as not to interfere with the sliding engagement of the sliding shelf 18 with the guide 17, as heretofore described. A secondary sliding shelf 22 is positioned in the secondary guides 21—21 and movable forwardly and backwardly therein on a plane above the sliding shelf 18 and parallel with the plane of movement thereof. The secondary sliding shelf 22 has a depending member 23 formed inwardly from its foremost edge and the member 23 is adapted to engage the raised front edge 19 of the sliding shelf 18 so that forward movement of the secondary shelf 22, as in moving the same out of the cabinet 10, will also move the sliding shelf 18 out of the cabinet 10. The rearmost edge of the secondary sliding shelf 22 will engage the raised rear edge 20 of the sliding shelf 18 when the secondary sliding shelf 22 is moved inwardly of the cabinet 10 and thereby move the sliding shelf 18 into the cabinet. It will be observed that the secondary sliding shelf 22 is approximately half as long as the sliding shelf 18 so that it will travel back and forth on the secondary guides 21—21 before engaging either the foremost raised edge 19 or the rearmost raised edge 20 of the sliding shelf 18.

A platform 24 is positioned on the uppermost surface of the secondary sliding shelf 22 and is hinged thereto by a secondary hinge 25 located along the foremost edge of the platform 24 and the foremost edge of the secondary sliding shelf 22. The platform 24 is thus capable of being moved from normal horizontal position to vertical position as shown in dotted lines in Figure 2 of the drawings. This enables the food mixer 26 to be tipped upwardly and over to a position where it is resting on its side and then moved inwardly of the cabinet 10 through the opening 15 which is of less height than the over-all height of the mixer 26 when in vertical position.

As the mixer is moved into the opening 15, the platform 24, which will then be in vertical position as also shown in dotted lines in Figure 2 of the drawings, will move into the cabinet and by reason of the secondary hinge 25 will slide the secondary sliding shelf 22 into the cabinet. When the rearmost edge of the secondary sliding shelf 22 engages the rearmost raised edge 20 on the sliding shelf 18, the shelf 18 will also move into the cabinet.

It will be observed that the initial action of moving the mixer 26, the platform 24 and the secondary sliding shelf 22 into the cabinet will not move the sliding shelf 18 which will therefore form a rest for the mixer in position on its side. The device thus adequately supports the mixer in vertical position in use and on its side in storage position. It will be seen that as the device is continued to be moved, the sliding shelf 18 will also move into the cabinet in position beneath the mixer so as to support the same.

When the mixer 26 and the sliding shelf 18 are in retracted position, the false drawer front 13 may then be closed and held in closed position by a friction catch. An electric outlet may be installed in the cabinet and within the opening 15 to which the mixer may be connected, as known in the art. The mixer will thus be ready for use immediately upon withdrawing the same from its storing position and moving it to vertical position on the platform 24 on the secondary sliding shelf 22 which in turn is supported by the sliding shelf 18.

It will be obvious to those skilled in the art that the positioning of the secondary guides 21—21 is optional and that they may alternately be positioned on the sides of the cabinet 10 immediately above the guides 17—17 as the operation of the sliding shelves will remain subsequently the same with the guides in either position.

It will thus be seen that the several objects of the invention have been met by the construction disclosed herein and it will also be seen that a practical and efficient sliding shelf for a food mixer has been disclosed which will adequately support the food mixer in vertical position for use and simultaneously provide a work space in connection therewith and when in retracted position will provide for the storage of the mixer in a relatively small space, less than the height of the food mixer itself when in vertical position.

Having thus described my invention, what I claim is:

1. The combination of a cabinet and a sliding shelf construction therein, the said cabinet having an opening therein and parallel oppositely disposed guides in said opening, a shelf slidably mounted in said guides, secondary guides on said sliding shelf and a secondary shelf slidably mounted in said secondary guides, a platform on said secondary shelf for supporting a food mixer, the said platform pivotally affixed at its foremost edge to the foremost edge of the said secondary shelf and means on said shelf and said secondary shelf for interengagement whereby movement imparted to the said secondary shelf will move the said shelf into and out of the said cabinet.

2. The combination of a cabinet and a sliding shelf construction therein, the said cabinet having an opening therein and parallel oppositely disposed guides in said opening, a shelf slidably mounted in said guides, secondary guides on said sliding shelf and a secondary shelf slidably mounted in said secondary guides, said secondary shelf being substantially half the length of the said shelf, a platform on said secondary shelf for supporting a food mixer, the said platform pivotally affixed at its foremost edge to the foremost edge of the said secondary shelf and means on said shelf and said secondary shelf for interengagement whereby movement imparted to the said secondary shelf will move the said shelf into and out of the said cabinet when the said shelves engage one another.

3. A cabinet having a sliding shelf construction therein, said cabinet having an opening wider than its height and guide members positioned in the said cabinet in registry with said opening and in parallel, oppositely disposed relation to one another, a pair of shelves one of which is slidably mounted in the said guides and the other one of which is positioned thereabove and supported thereby, the uppermost shelf being of substantially less length than the lowermost shelf, means on the said shelves for interengagement whereby movement imparted to the uppermost shelf will move the lowermost shelf into and out of the cabinet, a platform on the uppermost shelf for supporting a food mixer, the said platform being hingedly affixed to the foremost edge of the said uppermost shelf.

4. A cabinet having a sliding shelf construction therein, said cabinet having an opening wider than its height and guide members positioned in the said cabinet in registry with said opening and in parallel, oppositely disposed relation to one another, a pair of shelves one of which is slidably mounted in the said guides and the other one of which is movably positioned thereon, the uppermost shelf being of substantially less length than the lowermost shelf, means on the said shelves for interengagement whereby movement imparted to the uppermost shelf will move the lowermost shelf into and out of the cabinet, a platform on the uppermost shelf for supporting a food mixer, the said platform being hingedly affixed at its foremost edge to the foremost edge of the uppermost shelf.

ROBERT B. MARSHALL.

REFERENCES CITED

The following references are of record in the file of this patent:

UNITED STATES PATENTS

| Number | Name | Date |
|---|---|---|
| 427,954 | Bancroft | May 13, 1890 |
| 670,370 | Dewhurst | Mar. 19, 1901 |
| 718,627 | Hodges | Jan. 20, 1903 |